United States Patent
Lyle et al.

(10) Patent No.: US 8,047,915 B2
(45) Date of Patent: Nov. 1, 2011

(54) CHARACTER FOR COMPUTER GAME AND METHOD

(75) Inventors: John W. Lyle, Vero Beach, FL (US); Brenton Lyle, Belmar, NJ (US); Robert S. Ellsworth, Centreville, VA (US)

(73) Assignee: Lyle Corporate Development, Inc., Farmingdale, NJ (US)

( * ) Notice: Subject to any disclaimer, the term of this patent is extended or adjusted under 35 U.S.C. 154(b) by 786 days.

(21) Appl. No.: 11/329,578

(22) Filed: Jan. 11, 2006

(65) Prior Publication Data

US 2007/0167204 A1 Jul. 19, 2007

(51) Int. Cl.
*A63F 13/00* (2006.01)
(52) U.S. Cl. ......................................................... 463/31
(58) Field of Classification Search .................... 463/31, 463/40–43, 1, 9, 29, 32
See application file for complete search history.

(56) References Cited

U.S. PATENT DOCUMENTS

| | | | |
|---|---|---|---|
| 4,521,014 A | 6/1985 | Sitrick | |
| 4,600,919 A * | 7/1986 | Stern | 345/473 |
| 4,710,873 A | 12/1987 | Breslow et al. | |
| 5,676,551 A | 10/1997 | Knight et al. | |
| 5,772,508 A | 6/1998 | Sugita et al. | |
| 5,880,731 A | 3/1999 | Liles et al. | |
| 5,954,581 A | 9/1999 | Ohta et al. | |
| 5,977,968 A | 11/1999 | Le Blanc | |
| 6,106,395 A | 8/2000 | Begis | |
| 6,147,692 A | 11/2000 | Shaw et al. | |
| 6,268,872 B1 | 7/2001 | Matsuda et al. | |
| 6,283,858 B1 | 9/2001 | Hayes, Jr. et al. | |
| 6,285,380 B1 | 9/2001 | Perlin et al. | |
| 6,290,602 B1 | 9/2001 | Kawano | |
| 6,532,011 B1 | 3/2003 | Francini et al. | |
| 6,535,215 B1 * | 3/2003 | DeWitt et al. | 345/473 |
| 6,545,682 B1 | 4/2003 | Ventrella et al. | |
| 6,616,533 B1 | 9/2003 | Rashkovskiy | |
| 6,677,967 B2 | 1/2004 | Sawano et al. | |
| 6,692,359 B1 * | 2/2004 | Williams et al. | 463/42 |
| 6,714,661 B2 | 3/2004 | Buddenmeier et al. | |
| 6,731,307 B1 | 5/2004 | Strubbe et al. | |
| 6,758,746 B1 | 7/2004 | Hunter et al. | |

(Continued)

OTHER PUBLICATIONS

"The Sims 2" Game Manual—www.replacementdocs.com.*

(Continued)

*Primary Examiner* — David L Lewis
*Assistant Examiner* — Eric M Thomas
(74) *Attorney, Agent, or Firm* — Schiff Hardin LLP

(57) ABSTRACT

A video game character or avatar is generated using images of the player so that the on-screen avatar being controlled by the player appears like the player. Answers to a questionnaire or a psychological profile are provided by the player to determine characteristics that the player views as desirable, which are used to generate a final version of the avatar. Iterations of the avatar appearance are generated from the initial appearance to the final, more desirable appearance. Using the avatar, as play of the game proceeds the player's avatar begins as a character appearing like themselves and gradually becomes a character that is more as they would like to appear. The avatar increases the emotional impact of games by providing strong visual and psychological connections with the player. The avatar may instead begin from an initial character that does not appear similar to the player. The iterations may make the avatar gradually less appealing or with other changes in appearance, in some embodiments.

21 Claims, 5 Drawing Sheets

U.S. PATENT DOCUMENTS

| | | |
|---|---|---|
| 6,795,808 B1 | 9/2004 | Strubbe et al. |
| 6,805,631 B2 | 10/2004 | Izumi |
| 6,816,159 B2 | 11/2004 | Solazzi |
| 6,834,115 B2 | 12/2004 | Maurer et al. |
| 6,853,379 B2 | 2/2005 | Buddemeier et al. |
| 6,876,364 B2 | 4/2005 | Buddemeier et al. |
| 2002/0008716 A1 | 1/2002 | Colburn et al. |
| 2002/0054072 A1 | 5/2002 | Hayes-Roth |
| 2002/0067362 A1 | 6/2002 | Agostino Nocera et al. |
| 2002/0143622 A1 | 10/2002 | Taliercio et al. |
| 2003/0028383 A1 | 2/2003 | Guerin et al. |
| 2003/0031381 A1 | 2/2003 | Ho et al. |
| 2003/0034978 A1 | 2/2003 | Buddemeier et al. |
| 2003/0043153 A1 | 3/2003 | Buddemeier et al. |
| 2003/0063794 A1 | 4/2003 | Rubinstenn et al. |
| 2003/0065255 A1 | 4/2003 | Giacchetti et al. |
| 2003/0065589 A1 | 4/2003 | Giacchetti |
| 2003/0108244 A1 | 6/2003 | Li et al. |
| 2003/0206170 A1 | 11/2003 | Bickmore et al. |
| 2003/0206171 A1 | 11/2003 | Kim et al. |
| 2004/0038739 A1 | 2/2004 | Wanat |
| 2004/0053690 A1* | 3/2004 | Fogel et al. .............. 463/31 |
| 2004/0152512 A1 | 8/2004 | Collodi et al. |
| 2005/0057670 A1 | 3/2005 | Tull et al. |
| 2005/0085296 A1 | 4/2005 | Gelb et al. |
| 2005/0137015 A1 | 6/2005 | Rogers et al. |
| 2005/0153764 A1 | 7/2005 | Sterchi et al. |
| 2006/0121991 A1* | 6/2006 | Borinik et al. .............. 463/43 |
| 2006/0148567 A1* | 7/2006 | Kellerman et al. ........... 463/42 |

OTHER PUBLICATIONS

Computer role-playing game from Wikipedia, the free encyclopedia pp. 1-7.
The Sims 2—Amazon.com: Computer & Video Games: The Sims 2.
Face Factory Add-On for The Sims—Amazon.com: Computer & Video Games: Face Factory Add-On for the Sims.
Project Entropia Information About Different Areas Within Project Nov. 11, 2005—Two pages.

* cited by examiner

CHARACTER FOR COMPUTER GAME AND METHOD

BACKGROUND OF THE INVENTION

1. Field of the Invention

The present invention relates generally to a character for use in a video game and to a method for providing such character. The present invention also relates generally to providing a character or avatar for a computer or video display.

2. Description of the Related Art

Computer games are becoming increasingly popular among players of all ages. Among the types of computer games are computerized versions of existing games such as the common solitaire card game, chess or pinball games. A popular genre of computer games is the role-playing game in which the player assumes control of a character in the game and moves the character through various environments depicted on the computer or video screen. These role-playing games include so-called first person shooter games, such as Doom, in which the player looks out of the eyes of the character into the environment in which the character is moving, and generally does not see their own character on screen. In other words, the player has a first person perspective of the character that the player controls. There are also so-called third person shooter games that have the player looking over the shoulder of the character being controlled.

In another type of game, a top-down perspective is provided. The environment of the game is seen from an air-borne view. A related type of game provides a third person perspective view of the game environment. In this type of game, the player controls the actions of a character that appears on screen as viewed by a third person. This character is moved through the environment displayed on the screen and interacts with articles and other characters shown on the display. The environment or virtual world depicted on the display may be two-dimensional or three-dimensional and the character moves through and interacts with this virtual world under the control of the player.

Examples of some of the types of role playing computer games available are military and combat games where the character is fighting other characters on the screen, sports games where the character plays a sport such as golf, and adventure games where the character undertakes various adventures, although many other types of games are available. Examples of some themes of the games are: fantasy role playing, sci-fi role playing, historical, horror, and various combinations thereof.

The role playing games are a form of interactive and collaborative storytelling, centered on a script provided by the game developer. In role-playing games, participants play the parts of characters in an imaginary world that is organized, adjudicated, and sometimes created by the game developer or by a game master or narrator. The game developer's role is to provide a world and a cast of characters for the players to interact with, and to adjudicate how these interactions proceed. In addition, the game developer may also be responsible for advancing some kind of storyline or plot, albeit one which is subject to the somewhat unpredictable behavior of the players.

In a sense, the players are the actors who play the heroes, improvising more freely while the game developer plays all the supporting roles (ranging from villain to victim) and keeps them at least partly limited to the script that the developer had in mind as the writer. At the same time, the game developer directs or referees the outcome of each decision, and these decisions produce and stage the game setting. The role-playing game is not won or lost in the traditional sense of playing a card game or sporting match, but is based on the enjoyment that the player receives from playing the game. In one sense, the only way to lose the game is to not enjoy playing it.

Over the past ten years, improvements to video game graphics and visual effects have resulted in dramatically realistic game worlds. New games focus on improved graphics, realistic scenery, and better sound effects. While these developments have brought the player closer to the game's internal world, games have not yet fully accomplished the effect of bringing the player completely into the game's world.

The first step toward player interactivity has been the creation and rising popularity of Massively Multiplayer Online Games (MMOG). MMOGs permit many players to participate simultaneously with one another. The decisions that these players make and their level of cooperation with one another provides the storyline of the game. In general, these games are non-competitive in nature and enable the players to determine the success or failure of their character based on their interaction with the virtual world as opposed to competing with one another. Within these digital worlds, the majority of player satisfaction comes from the social interactions with other players in online games. In these types of games, players associate themselves far more closely with their online characters than in any previous genre of gaming.

An increasingly popular genre of on-line game is the so called Massively (or Massive) Multiplayer Online Role Playing Game (MMORPG). This is a multiplayer computer role playing game that enables thousands of players to play in an evolving virtual world at the same time over the Internet. MMORPGs are a particular type of MMOG. One popular MMORPG is World of Warcraft which currently has more than three million subscribers. In order to accommodate so many players, this game has a hundred separate game worlds.

The MMOG marketplace is unique in the videogame industry because it has monthly subscription plus initial software revenues. Unlike traditional console or PC games, each player must have a subscription account to the game and cannot share or borrow access to the game (such as by borrowing a cartridge or CD). In addition, these games are exceptionally "sticky", with some games having over 100,000 players who have had subscriptions for at least eight years.

In these and other role-playing games, the player assumes a character or avatar (a graphical representation of the character) at the beginning of the game and moves that character through the various virtual environments in the game while performing various complex tasks in order to achieve rewards. For instance, the achievement of some tasks results in the character receiving better weapons, different clothing, or being provided with better skills or abilities. A character's power usually represents how much time is invested in playing the game. Casual players may play a few hours per week but so-called hardcore gamers may spend 40 hours or more per week playing a particular game. Not surprisingly, players of these games have developed their own terms and slang, which are too extensive and transient to go into here. Long-term play of role-playing games results in the player developing an affinity for the chosen character and in some sense the character becomes the alter ego for the player.

This alter ego association of the player and character increases the player's enjoyment of the game. The character, and thus the player, is rewarded for accomplishing complex tasks in the game and the player feels good about these accomplishments. These rewards may be better skills or abilities, or better material goods (in the virtual world) such as shinier armor. Further, the types of games with the most emotional impact are those where the player is playing himself or herself, while the weakest are those in which the player simply controls the outcome of the game via skill. In the top emotional impact games, the player identifies and associates with the character he or she is playing, i.e. feeling sadness, excitement, fear, joy, plus any other emotion that the character is exhibiting on the screen.

Computer games may run on a stand alone computer or may run on a computer connected to a network to interact with other computers, for instance in peer-to-peer networking, or with one or more server computers following a client-server model. The Internet is increasingly becoming the network of choice for network game play, also known as on-line gaming. The server computers that host the game store the information describing the persistent virtual worlds of the game as well as information on each of the characters in the game. The character information includes, in one example, a wireframe definition of the character that determines movements, general shape and size, an appearance layer that is applied to the wireframe to define the avatar's appearance, and an outerwear layer such as clothing, armor, helmets or hats, weapons, and the like. The wireframe is set by the game developer and determines the character's movements. The appearance layer generally remains unchanged throughout the game. The character usually begins with a set outerwear layer, and some articles of the outerwear may change during the course of the game depending on accomplishments during the game.

The inventors have recognized a problem with the characters or avatars in role-playing games in that the same basic character set is utilized by all players of the game. A player of a multiplayer game may find themselves in a room or area in the virtual world of the game with the characters or avatars of many other players and all of the characters look alike, or they differ from other characters only in insubstantial ways, such as hair color or facial hair. The inventors have recognized a second problem with the characters or avatars of these role playing games, in particular that the characters remain basically unchanged during the course of play. The storyline of the game becomes increasingly more interesting and more challenging as the player plays the game, and the advancement of play may even have the characters developing greater strength and abilities and becoming more powerful or faster, but the on-screen appearance of the character or avatar is the same one with which the player began the game.

A player that starts a game with a chosen character and temporarily leaves the game has the identity of that player's character stored on the server (or servers) so that when the player returns to play the game, the same character is provided to the player and the accomplishments and status of the character are at the same level as when the player stopped playing. In the World of Warcraft game, for example, the same character is used by the player through all sixty levels of the game.

SUMMARY OF THE INVENTION

The present invention provides a character or avatar and a method to provide a character or avatar for display on a display panel or video screen. In one application, the character is used in a computer game, such as a role-playing computer game. The character of one embodiment has an appearance that is derived from the player. The derivation may be from the physical appearance of the player or from some other characteristic of the player. For example, a profile of the player may be taken and the appearance of the character or avatar derived from the profile. In another aspect of the invention, the appearance of the character or avatar on the display or video screen changes throughout the course of use by the user or player. For example, if the character is used in a computer game, the appearance changes as the player plays the game and achieves certain goals or tasks in the game. The changes may be derived from information obtained from the player.

The present character or avatar is intended for use primarily in video game or computer game applications, but it is envisioned that the avatar may be used in a variety of other applications, including chat rooms, image editing and modification, diet planning and plastic surgery, video conferencing, mobile phones and even in dating services. Many other on-screen displays of characters or avatars are also possible, including those that are currently available and those available in the future.

In one application, the character is utilized in a role-playing video game or computer game. The player of the computer game or video game has considerable input into the appearance of the character at the beginning of the game. Preferably, the appearance of the character changes along the course of use or over the course of play of the game.

In a particular preferred embodiment, the appearance of the character is derived from the physical appearance of the player such as by utilizing a photograph or other image of the player and various traits of the player are utilized in changing the appearance of the character. For example, a psychological profile may be made for the player and the players desired appearance characteristics such as being taller, more muscular, or thinner, may be implemented as changes to the on-screen character in the role playing game.

In a preferred embodiment, the player or user has the ability to modify the initial generated character through image editing tools during the character creation process.

In one preferred embodiment, the generated character is further enhanced to match the style of the application. In one application, for example, the game characters may all be in the style of Anime and the generated character using the user's image will be modified to match. Other styles are of course also possible.

In an alternate embodiment, the psychological profile obtained from the player is used to create supporting characters (such as villains and victims) that are, for example, generated by the game software to enhance the believability, realism, and emotional connection with the player.

The present avatar and method takes the emotional impact of games and amplifies it by making the player and their game character even more connected through both a visual and psychological connection. Players view themselves in the game and see themselves, through their character, evolve into subsequent iterations toward an ideal self or character. This increase in the emotional connection increases the emotional impact of the game.

BRIEF DESCRIPTION OF THE DRAWINGS

FIG. 1-B is a process flow chart showing the method according to the principles of the present invention using an external application for generating avatars;

DETAILED DESCRIPTION OF THE PREFERRED EMBODIMENTS

The present invention provides a method and apparatus for providing a character or avatar for a game such as a role-playing game and in particular for a 3D role-playing game. A user of the role playing game uses an on-screen character to represent themselves during the game. The user controls the action of the on-screen character, bringing the character through various adventures, taking actions, performing tasks and the like. During the play of the role-playing game, the character (and thus the user) obtain certain objects or achieve certain goals. For instance, the character may obtain a suit of armor or particular weapon or reach a particular area in the virtual world or the player may achieve a certain score in a sports game. As a reward for achieving these complex tasks in the role-playing game, the on-screen character or avatar changes in appearance. The changes in appearance are tailored to the psychological information obtained from the player. The avatar becomes the alter ego for the player and the changes in appearance according to the present invention is intended to strengthen the alter ego effect of the avatar.

The player of the role playing game starts with, in one embodiment, an avatar or a character which appears as themselves. Over the course of play, the character becomes more of whom the individual wishes to be, whether taller, stronger, slimmer or other physical aspects, which may be desirable to the player. A strengthening of the alter ego association is thus effected. Further, in MMOGs involving group play, members of a group are able to see images of their own friends or group members through the use of such avatars, thus strengthening the desire to play these community-driven games. As an alternative, the changes in the character may utilize the information from the user to change the character in negative ways, becoming more of what the user wishes to avoid if the character fails to achieve the set goals. While this alternative may not be useful in keeping game players playing the game, it is envisioned to have other uses.

Figure 1:
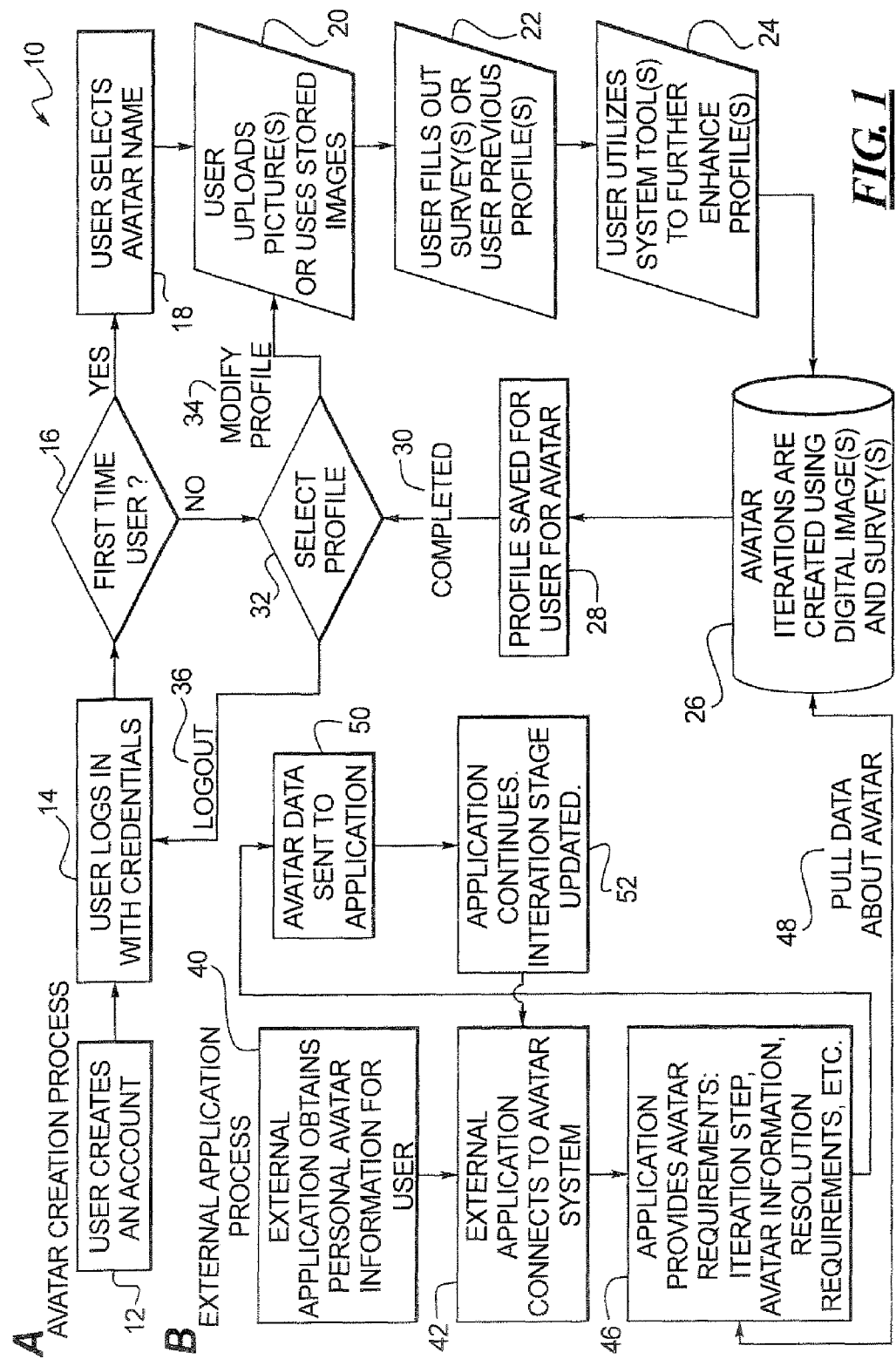
FIG. 1-A is a process flow chart showing the method accord to the principles of the present invention using an internal application for generating avatars.

With reference to FIGS. 1-A and 1-B, an avatar is created according to the process flow chart 10. Within the external application using the avatar or through a central application connected to the application using the avatar, the process begins with the user creating an account 12. To create the account, the user logs in with the user's credentials 14. An inquiry is made as to whether the user is a first time user 16. If so, the user is requested to select an avatar name at process block 18. Once an avatar name is selected, the user is requested to upload, at block 20, photos or other user stored images, such as digital images, that will be used to create the user specific avatar. The uploaded photos should in some embodiments include scalar information or other size information so that the size of the user may be determined. This enables the resulting avatar to be correctly sized relative to background objects and to other avatars or characters. The user is requested, at 22, to fill out a survey or questionnaire or to provide a previous profile of user specific information. The previous survey or questionnaire can be provided as an upload, a link to the previous survey or some other means for providing the already obtained information. In block 24, the user may use the system tools to modify or otherwise enhance the profile of the user. This step is optional, depending on the use to which the profile will be put, as some applications may benefit from user survey data without the opportunity of the user to change responses.

Following the input of the user information, the avatar creating process at 26 creates a customized avatar using the images provided by the user and the survey results of the user. Not only is a single avatar created, but several iterations of the avatar are generated using the survey results. This iteration creation process includes utilizing the images and the survey data to create an initial image of the avatar and then to create a final image of the avatar showing the final apparition of the avatar at the conclusion of the game, for example.

The user profile is saved, at block 28, after which the avatar generation process is completed, as indicated at 30. The user may modify their profile by selecting a profile to be modified, at 32, and requesting that the profile be modified, at 34. This returns the process to step 20 where changes can be made by the user and then saved as a modified profile. Instead of modifying the profile, the user may choose to log out, at 36.

With reference to FIG. 1-B, having created and potentially modified a profile, the user may use it in a role playing game or other application. To initiate this process in one embodiment, the external application, which may be a role playing game, obtains the user information, at block 40. The external application connects to the avatar system, at 42. The application provides the avatar requirements, the iteration steps, the avatar information and the resolution requirements to the avatar generation system as indicated at step 46. The stored avatar information is pulled from the avatar generation system as indicated at 48 and is provided to the application, as indicated at 50. Once the avatar data is received in the application, the avatar is presented to the user for use in the application, for example for playing the role playing game. During the play of the game or other operation of the application, the iterations generated by the avatar generator are utilized, as indicated at 52. The user is thus able to utilize the avatar in the external application.

Figure 2:
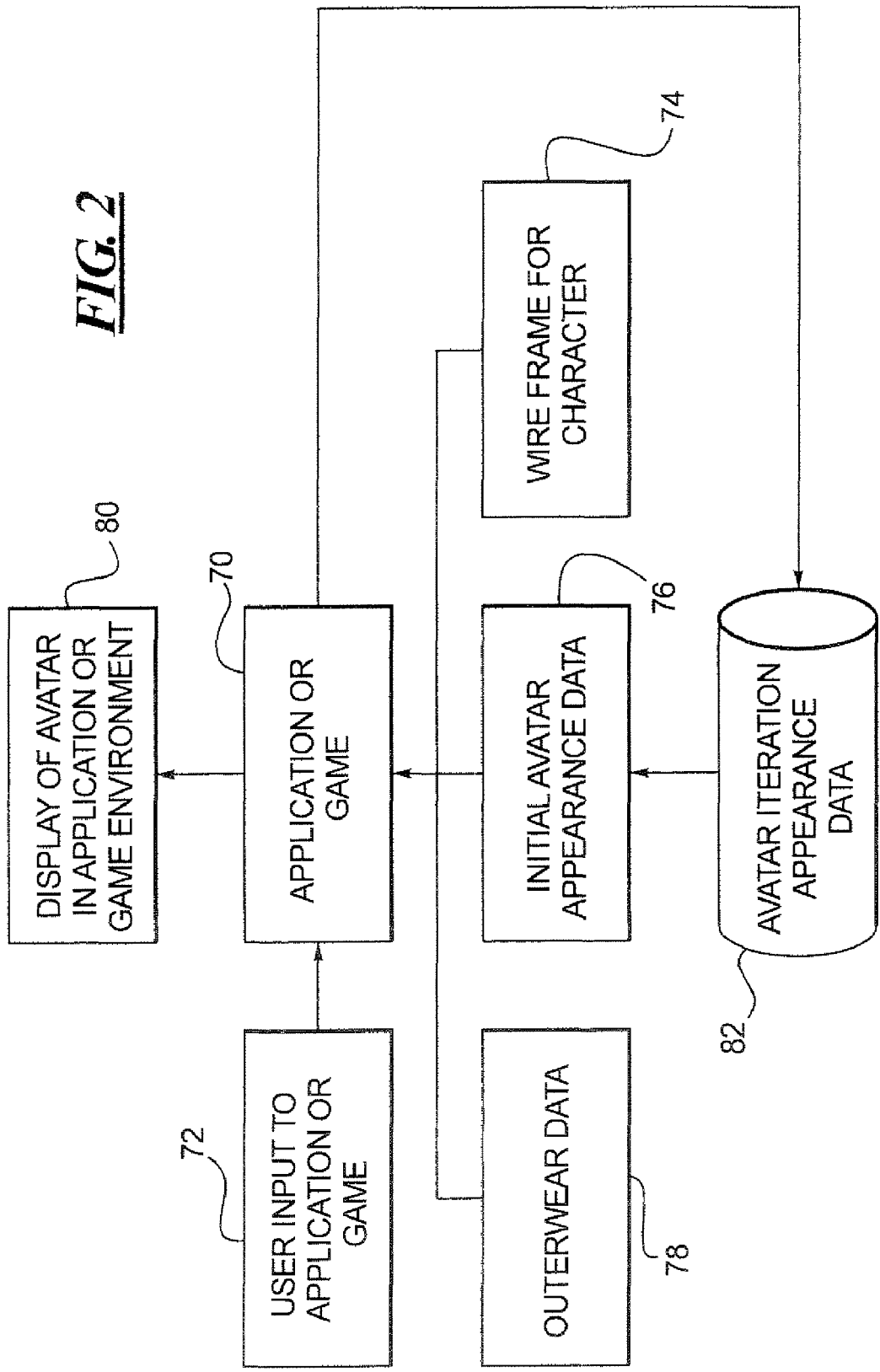
FIG. 2 is a block diagram showing the component parts of an avatar component system.

Referring to FIG. 2, the application, such as a role playing game, is shown at block 70. The application 70 is accessed by a user who provides user input at 72. The user of the role playing game, for instance, makes use of an avatar as a depiction of the character controlled by the user. The avatar according to a preferred embodiment is made up of various components. First, the character or avatar includes a wireframe 74 which defines the position and motion of the avatar. The wireframe 74 is typically provided by the application designer. Over the wireframe 74 is provided an avatar appearance layer 76. This is the custom layer that is derived for the particular user, such as from photos or other images of the user to provide an initial avatar appearance 76. In a role playing game where the user is to appear as themselves in the game, the initial appearance avatar 76 is applied to the wireframe 74 to provide the "skin" of the character or avatar. The character will generally be provided with clothing, shoes, hats or helmets, armor, weapons, or other items, which for purposes of this drawing are referred to as outerwear. The outerwear is obtained from outerwear data 78. It is of course possible that the avatar may be complete in appearance without application of outerwear, so this element would be unnecessary and thus eliminated.

The preferred avatar is therefore formed of three components in the preferred embodiment, the wireframe data 74, the avatar appearance data 76, and the outerwear data 78. The complete avatar is displayed on the display apparatus in the environment of the game or other application, as indicated at 80. The user plays the game or uses the application. As the application or game progresses as a result of the user's actions, for example, the user achieves various goals or performs various required tasks. As a reward for having accomplished this goal or task, the displayed avatar is changed in appearance by application of an iteration 82. It is possible that more than one iteration of the avatar appearance may be applied in one step, depending on such things as the level of accomplishment by the user, the resolution of the display or other factors. If the user continues to use the application or play the game and accomplish the tasks, further iterations are applied. At the end of the application or game, the final appearance of the avatar is applied. This final appearance, and each iteration leading up to it, are derived from the user's responses to the questionnaire or interview. The user of a preferred embodiment finds each iteration more appealing, or at least more of how they would like to appear.

In developing the character or avatar, the user may provide a picture or other image, as shown at step 20 in FIG. 1-A and FIG. 1-B, as a starting point for development of the avatar. Further, the user or player is subjected to psychological testing, such as answering questions or filling out a survey as shown at 22, to determine the physical or appearance characteristics which are desirable to this user. Alternatively, the user may simply identify traits which are desirable such as by selection from a list. The avatar is generated as a beginning character or avatar, as indicated at 76 in FIG. 2, for the on-screen play and multiple iterations of the character, as shown at 82, are developed so that each level of play for the game or complex task completion is accompanied by an iterative change in the physical appearance of the character. The player of the role-playing game thereby feels a more personal involvement in the play of the game and a stronger attachment to the avatar than with previous generic characters.

Figure 3:
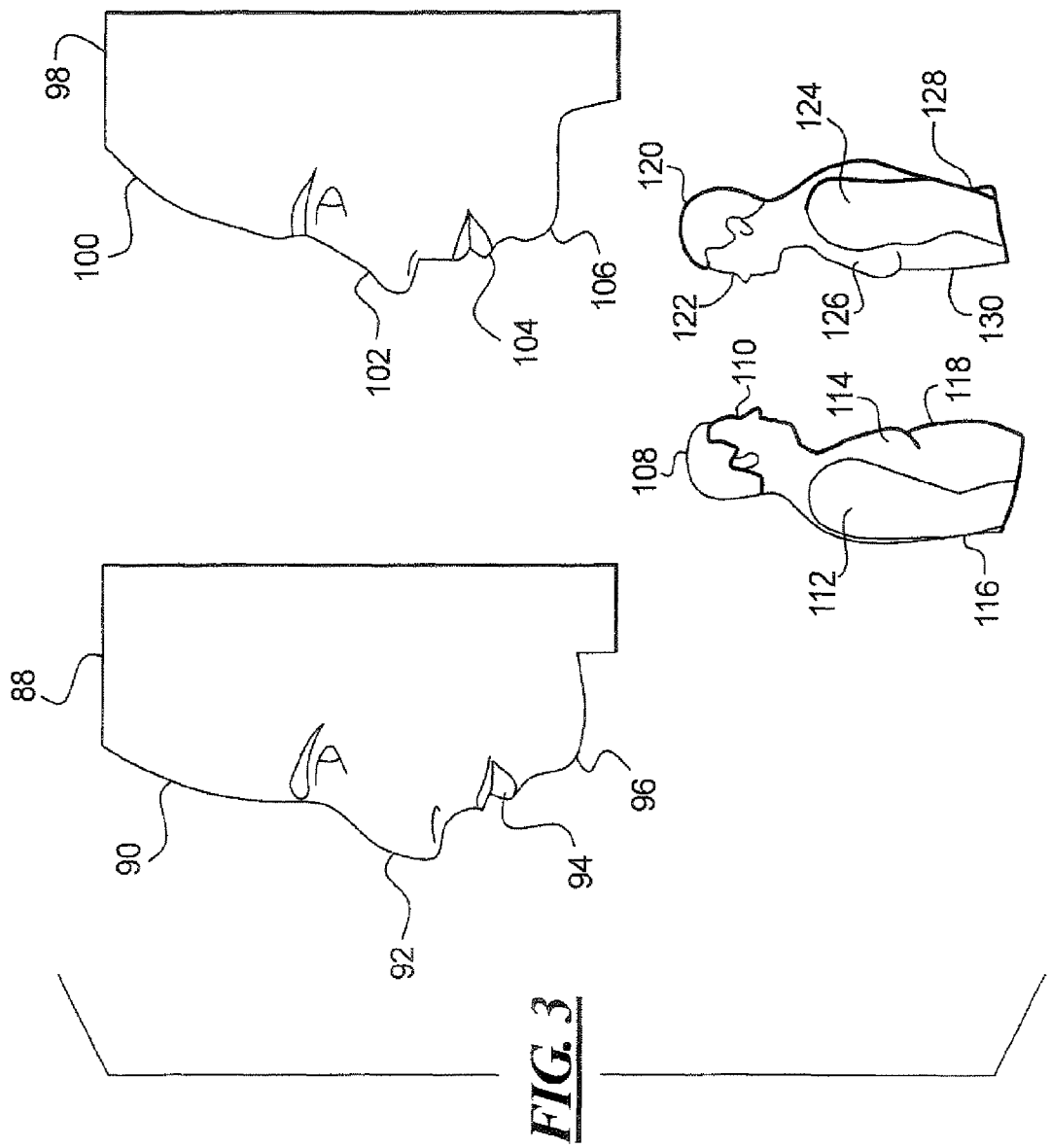
FIG. 3 is a representation of an on-screen character or avatar embodying the principles of the present invention and showing changes in physical characteristics representative of progress through a role playing game.

FIG. 3 is a representation of an on-screen character or avatar embodying the principles of the present invention and showing changes in physical characteristics representative of progress through a role playing game. The initial avatar 88 begins with an appearance that looks like the user or player of the external application. For example, the initial avatar 88 begins with an initial forehead 90, an initial nose 92, initial lips 94, and an initial chin 96 that looks like the images provided by the user or player as indicated in FIGS. 1A and 1B step 20. Over the course of playing the game or using the application, the physical appearance of the initial avatar changes to reflect the psychological desires of the player or user, as indicated by step 22 in FIGS. 1A and 1B. The final avatar is the ultimate depiction of the answers or information provided by the user in the psychological profile. In FIG. 3, this final avatar 98 has a forehead with an adjusted slope as shown by forehead 100. The final avatar 98 also includes a nose 102 in which the bump has been removed and the tip rounded out as compared to the initial nose 92, lips 104 in which the appearance of the lips are more symmetrical and fuller as compared to the initial lips 94, and a chin 106 in which the appearance is squared as compared to the initial chin 96. In this respect, the final avatar 98, after several iterations, has acquired the physical appearance desired by the player or user.

FIG. 3 also shows changes in physical appearance of an avatar's body from an initial avatar to a final avatar. Initial avatar 108 includes an initial face 110, initial arms 112, an initial chest 114, an initial back 116, and an initial abdomen 118 that looks like the images provided by the user or player as indicated in FIGS. 1A and 1B step 20. Over the course of playing the game or using the application, the physical appearance of the initial avatar changes to reflect the psychological desires of the player or user, as indicated by step 22 in FIGS. 1A and 1B. The final avatar is a depiction of what the user or player wants his or her body's physical appearance to look like under ideal circumstances. In FIG. 3, for example, this final avatar 120 has a square face for maximum masculinity as shown by face 122. The final avatar 120 also includes arms 124 which have added muscle tone as compared to initial arms 112, a chest 126 with added muscle tone as compared to the initial chest 126, a back 128 with improved posture and a thin waist area as compared to the initial back 116, and an abdomen 130 with added muscle tone and a thin waist area as compared to the initial abdomen 118.

Alternatives according to the present invention provide that the iterative changes in the character's physical appearance may, instead of making the character iterations more appealing to the user, make the character less appealing in appearance such as by becoming meaner looking, or tougher or funnier looking. Such changes may be triggered by choices in the metaphorical path chosen by the character in the role playing game so that a character that chooses a nobler path becomes nobler looking and a character who chooses a darker path becomes more sinister or more troll-like.

It is within the principles of the present invention that the character chosen by the player to begin the game need not have an appearance similar to that of the player. For instance, a player of one gender may choose to play the game as a character of another gender or the player may choose a beginning character which is fanciful, such as an animal, imaginary character or other creature or object, rather than appearing as oneself. The iterations in appearance of the chosen character are implemented as the game or application progresses and as the player achieves the tasks set out in the script of the game. As before, these changes in physical appearance of the character are implemented by iterations to a final character. The iterations and final character may be derived from the survey or questionnaire asked of the user, for example, to apply psychological information gleaned from such survey or questionnaire to change the character to one the user finds more desirable. In one example, a fictional character or imaginary character may become more noble appearing as the game or application progresses.

It is contemplated that the principles of the present invention may be applied to a role playing character that begins the game as one character and slowly becomes another character. For example, a player that begins a game with a character that appears as a dog may see that character gradually becoming a lion as the game progresses. Or, in another example, a female player that begins the game with a character that appears like the female player's own image may become a man's image through iterations using the woman's original image. Many other variations are, of course, possible and are within the scope of the invention.

The present method and apparatus thus provides a personalized character or avatar for a user of a computer game. This enables the character to be recognized by other players of the multiplayer game rather than having all of the characters appear as generic characters. A greater degree of individualization of the characters for the game is accomplished. Further, even in first person multiplayer shooter games, the user or player is able to recognize the members of his own team, as well as recognize members of the opposing team, thus increasing the social interactions and emotional attraction to multiplayer games. The personalized characters of the various players playing the role playing game enhances the peer dependence and peer identification aspects of the game. Just like any social hierarchical group, players wish to be identified not only by their affiliation with winning teams but also within their team for their strengths. In the game environment, the present avatar enables the player not to just assume the identity of the main character, but to be the main character.

It is foreseeable that the character or rather character set with its various iterations may be moved from one game to another or that the character may move from one version of a game to another version of the game. The player who starts the game appearing as him or herself and advances to a more handsome or beautiful, taller or fitter or otherwise more appealing character, may so enjoy the effect that the player wishes to take this character through other adventures of other games or through further adventures of other versions of the same game. Further, a player or user can create a permanent character on a website, and choose a codeword to identify the permanent character. After creating this permanent character, a player or user can insert the codeword when playing a new game or using a new application, and as a result the user or player can use the avatar component in the new game or application.

According to one aspect of the invention, information and data to generate an initial character such as from a photograph or series of photographs of the player and from the psychological profile or other questionnaire is utilized to generate a set of characters to provide a character for each iteration of the game. It is also possible to use a video or other media image of the player as a starting point for the initial character. Such character sets may include fifteen or more character iterations or may be extended even further depending upon the game developer script, the resolution of the game and/or display and the desires of the player.

By personalizing the characters or avatars in a game, friends may recognize one another in the playing of the game so that for example, an online sports game such as golf may result in a foursome of players playing together who recognize one another in the on-screen version just as they do when playing an actual round of golf on a course. Similar advantages are provided in military games, story games, mystery games, or other types of role-playing games.

Online role playing games, such as the massively multi-player online role playing games, utilize servers to store the programming for the game and the character information including the status of each of the characters and tracking of each player. For embodiments of the present invention, not only do the servers track the status of a player represented by a generic character, but the data set for the present character or avatar with each of its iterations is maintained on the game server as well.

In another embodiment, the character data, such as digital images and survey information, is maintained on the game server.

The character or avatar action in a role-playing game is the result of motion of the wire frame FIG. 74 which is moved according to the script of the game and the characteristics of the character in that game. The outward appearance of the character is a set of software commands which are applied to the wire frame character. The character may be provided with external adornment such as clothing, armor, hats, or weaponry according to the story of the game, for example, the outerwear depicted at 78. The present invention provides the character appearance data set for applying to the wire frame of the character so as to customize the appearance of the character or avatar. The character or avatar may still be adorned with clothing, armor, hats or the like which appear over the character appearance. Thus, the preferred embodiment of the present invention provides an intermediate image data set for applying over the basic wire frame of the moving character in the role-playing game and which lies under the outer garments or other accouterments of the character during various stages of the game. Further, the present invention can be used by a game company or company providing any external application because the avatar component can be modified to fit the game company's or external application company's software. In this scenario, the initial image will be a slight variation of the original photograph or image provided by the user or player in order to fit the wireframe of the external application. For example, if a game company's software uses certain scaled images, then the initial image of the avatar component will be modified to fit the game's scale.

Figure 4:
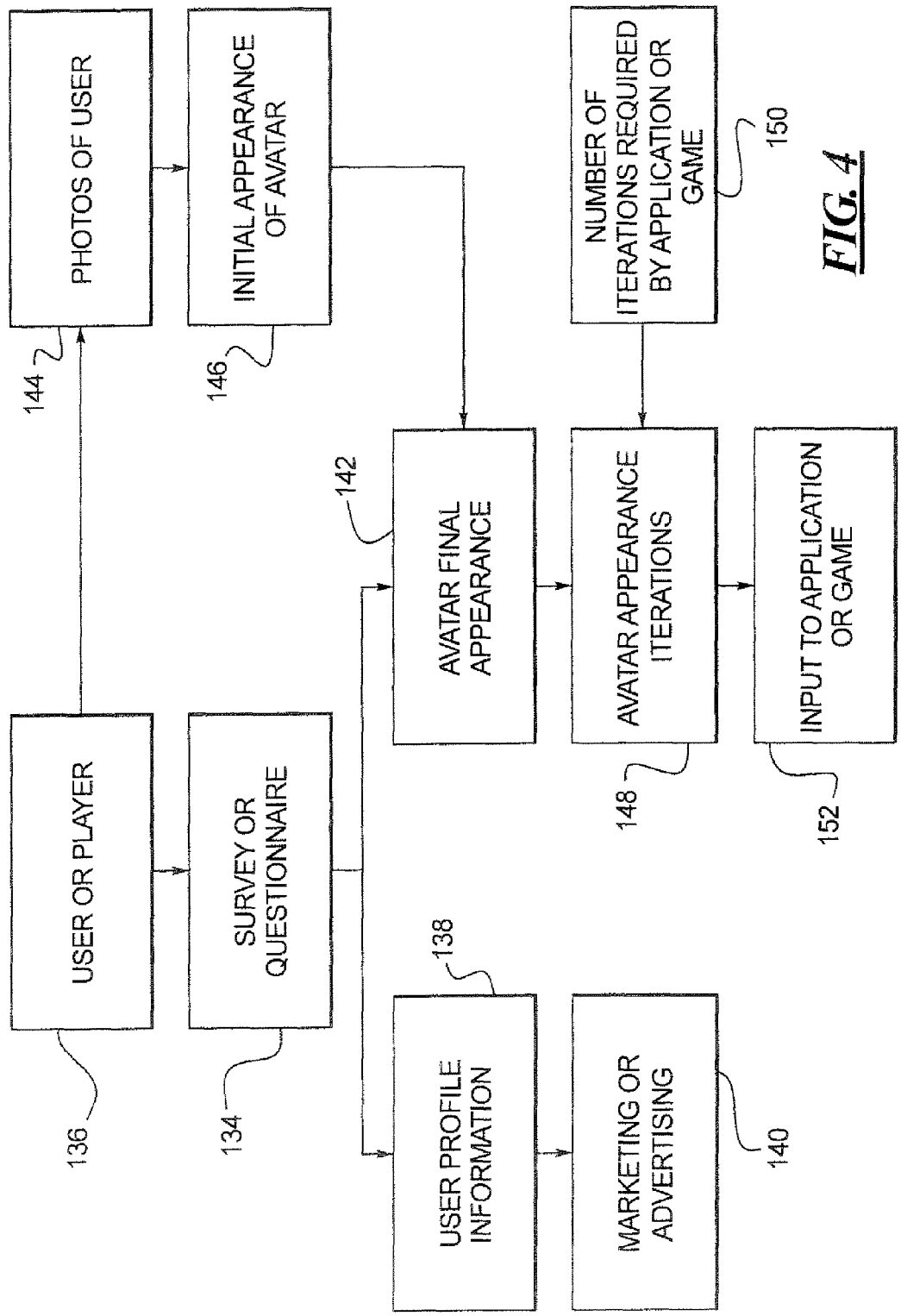
FIG. 4 is a block diagram of the user survey and the utilization of the results of the survey.

Turning now to FIG. 4, the linking of the changes in the character's appearance to the results of the psychological testing, surveys or questionnaires, as indicated at 134, may uncover information about the user's perception of beauty, desirability, strength or other admirable aspects. This information may be collected from a player or user, as indicated at 136, of the game as profile information 138 to determine user demographics for game players. This profile information may be utilized in marketing or advertising, as indicated at 140, to provide more effective advertising to a target audience. Advertising agencies may utilize this information to determine a user's or group of users' idea of what is ideal beauty. Information about the role playing game players may thereby be gleaned from the information collected in generating the characters or avatars as well as from the results of play and the progress toward desirable physical characteristics for the characters. As a result, advertisers may choose to advertise certain products on a website where component avatars may be created.

The survey or questionnaire 134 is, as mentioned in the foregoing, used to generate the final appearance 142 of the avatar. Specifically, the user 136 provides the photos 144 of the user. The photos are used to generate the initial appearance 146 of the avatar component. The initial appearance 146 is combined with the information from the survey 134 to generate the final appearance 142. Once the final appearance 142 is obtained, the appearance iterations 148 are generated. To ensure that the number of iterations are adequate and preferably that the number matches the levels, for example, of the game, the iteration generation process utilizes the information on the number of iterations 150 required by the game. Once the initial, final and intermediate iterations of the avatar are generated, they are provided to the game or application, at 152.

The profile information 138 of the player may be transferred to other games as well. Advertising may be incorporated into the game or otherwise displayed to the player, and a record of what advertising has been shown to the player is recorded as advertising characteristics of the player, which can either be recorded with the user profile or as a separate data item, which can also be transferred to other games.

A player of role playing games may utilize their characters in various games. On the other hand, a player may choose to utilize different characters for different games. The appearance of the characters may evolve based on game decisions such as whether the decision goes to good or evil. In one example, a normal appearing character or avatar may become a ghost or ghoul. In other games, science fiction characters may become more alien in appearance, or in comical games may appear goofier looking or more humorous looking. Characters may also be made to appear more sinister depending on the play of the game.

In determining the iterations of the character appearance, the game developer ultimately decides when the character appearance should change. A game developer may need, for example, fifteen levels of change 150 in the course of game play so that a user seeking a personalized character set or avatar set for a game would have fifteen iterations 148 of the character appearance generated.

Generation of the character and its iterations requires a sophisticated graphical rendering engine that takes the actual image or multiple images of the player or user and the player's or user's personal survey information to generate the character. The character generation engine of a preferred embodiment is built using C++ or some other high level language. The character development engine utilizes digital modeling, graphics development, database development, web design ad application process interface development. The personal survey information helps to identify what is the user's idea of a hero, what is the user's idea of a villain, what is the user's idea of beauty, etc. This personal information is used to modify the digital self of the initial character with the iterations and the final version of the character for the game. The generation of the character and the iterations are preferably automated to the greatest extent possible.

The combined user image information and user personal information creates iterations of the avatar component and enables the player's current image to evolve into the player's idealized avatar as the player progresses through the game or application. Depending upon the game, only some features may change while other features of the character may remain the same. The feature changes may include facial feature changes or body feature changes that are preferably incorporated in the skin, frame and facial appearance which are hung on the wire frame data 74 provided by the game developer.

The number of iterations 150 required for the game may be determined by the resolution of the game. Lower resolution games may limit the number of iterations which are recognizable by a player, whereas higher resolution games can have greater numbers of iterations since more subtle changes would be apparent to the viewer.

Character generation using the psychological profile of the player may also be used by the game designers to create more realistic and engaging in-game characters. These characters could also evolve based on levels or other game characteristics.

Another application of the present invention is to provide an improved physical appearance of a person on a videophone or on other video or display so that desirable characteristics appear on screen and less desirable physical characteristics of the individual are not apparent to the viewer at the other end of the video conversation. This could be used to not only make the user appear more handsome, beautiful, younger, or the like, but also to show the user dressed differently, such as making informal clothing appear more formal, cleaner, fewer wrinkles or the like in a video recording or display.

In a further application of the present technology, photographs and other still and video images are treated utilizing the principles of this invention. For example, wedding photographs or videos may be processed to show the people appearing in the wedding photographs with a little better appearance. For example, some may wish to appear younger or thinner or having some other desirable characteristic.

In an aspect of the present invention, mathematical models are utilized in developing the character appearance and the character iterations.

The business model utilized in the development of the present character or avatar is to provide the tools to generate a character set including a starting character and iterations of the character for a fee. Alternatively or additionally, the user may be charged a monthly fee for use of the character. It is alternatively or additionally contemplated to charge the operator of the online game a percentage of the monthly fees for utilization of the characters according to this invention. The characters may be sold to a developer or user. Different fee structures may be utilized for a high-resolution character versus a low-resolution character.

In a preferred embodiment, the player information and network provide directed advertising for the player in the game environment. The network provides either advertising demographic data (e.g., male, 30-35, masculine hero type) or the actual advertising for the game and track ad placements for advertisers, for a fee.

In a preferred embodiment, the on-screen character is still recognizable as the player so that other players could recognize that individual by either the physical appearance of their character on screen or by the appearance of the actual person. Thus, the role-playing games progress toward realism and bring role-playing games to an entirely new level. Personal involvement in the role playing game increases. This effect is particularly pronounced through the alter ego effect of the present character or avatar. In particular, the player of the role playing game feels a strong attachment to the on-screen character. With the character gradually becoming more like the player's ideal, the attachment becomes stronger, which is here referred to as an alter ego effect.

An alternative embodiment of the present avatar or character may be utilized in chat rooms, for dating services, for help icons on a software program, on mobile telephone displays or nearly anywhere a character or avatar appears in a screen or graphic display.

In submitting the photographs and other information for the present invention, scaling information is included in order to accord the character a proper relative size in proportion to other characters and in proportion to environmental objects in the game. The scaling information may include measurements of the user, such as height, length of limbs, proportions of facial features, and other measurement information. Where role playing games display several avatars, such information may be used to provide a taller avatar for taller players and shorter avatar for shorter players, for instance.

In developing the character or avatar, digital reference points are utilized to generate the character. For example, the placement of eyes, mouth, nose and ears are important features for generating an accurate player image in a three dimensional avatar. As such, a special photography session may be utilized to ensure that the necessary reference points are clearly visible in the photo. For example, the focal length of the lens may play a role in proper proportioning and positioning of the facial features. The distortions introduced by a short focal length camera lens, for example, may result in a generated facial image of the avatar that does not represent the true appearance of the player. On the other hand, it may be possible to utilize nearly any image of the user to generate the avatar and to compensate for image distortion, as necessary.

At their core, MMOGs (Massively Multiplay Online Games) are community-driven. As long as the player feels welcome to the team and is making a contribution to the team's success, he or she will continue to play the game. Just like any social hierarchical group, players wish to be identified not only by their affiliation with winning teams, but also within their own team for their strengths. This invention allows in-game community members to actually see and recognize each other in the game world, even in first person shooter games where the player does not see themselves but does see others on his or her team, producing a greater level of group-interaction and association. In turn, this invention increases the appeal of these community-driven games.

The present invention significantly adds to the value of video gaming products. By enabling the players to see themselves and their friends in the game, the appeal of the game is increased for players. The evolution of the character toward the idealized self of each player maintains the interest and keeps the players coming back. The present improvement provides both a strong visual and emotional appeal for the game.

Figure 5:
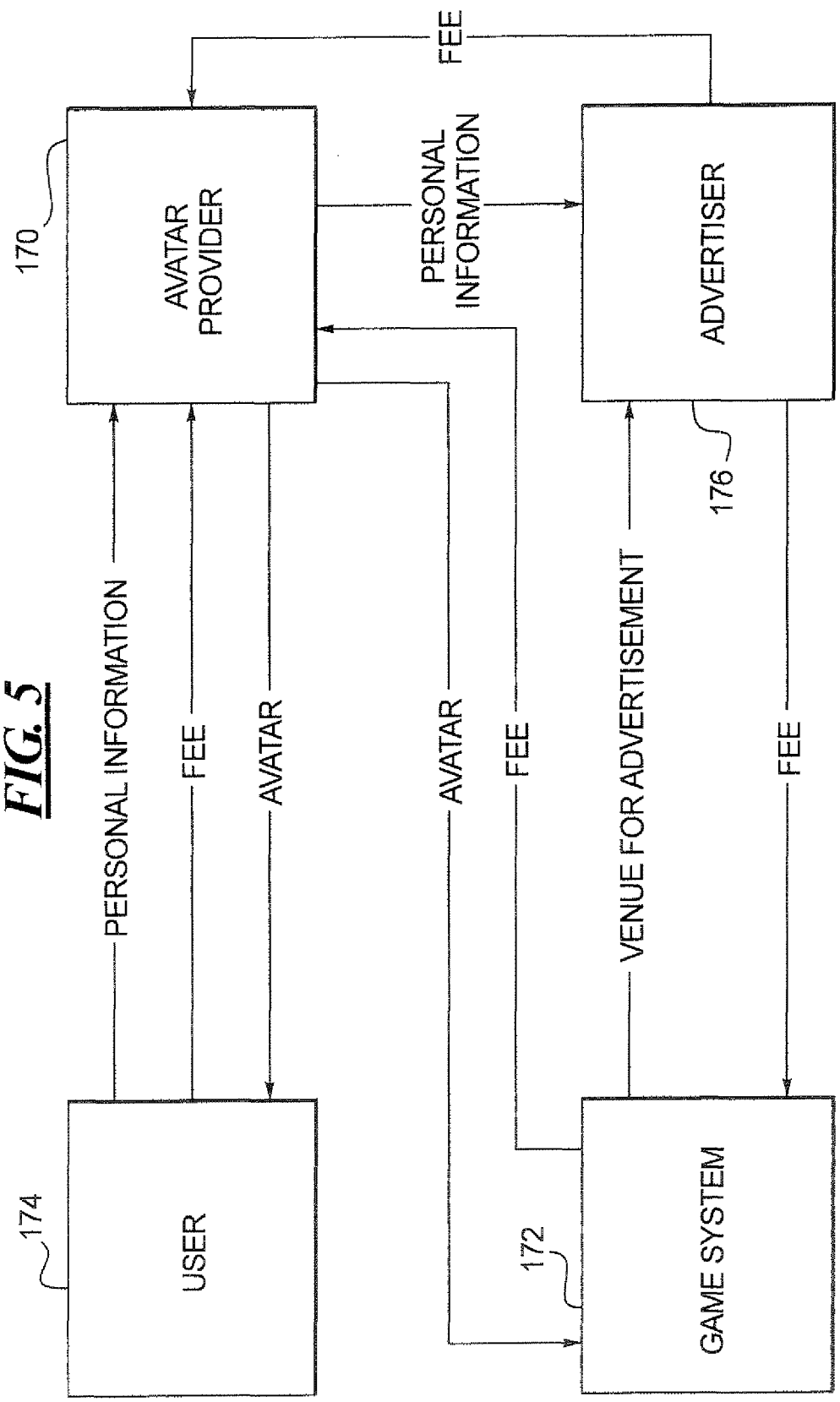
FIG. 5 is a process flowchart showing the method of providing an avatar through several channels.

According to aspects of the present invention a business model is provided whereby the originator or provider of the avatar or other game component operates through up to three channels or business structures while minimizing infrastructure and operating costs. As shown in FIG. 5, avatars or other game components are made available for each different game system 172, preferably in return for platform licensing fees. Each game platform and each game or game family may require different aspects, features, and iterations. The present method provides avatars for a game or game family (different versions of a game, for example) or for a game platform (which may require different resolutions or the like). The agreement to provide the avatars for the game or platform is arranged with the provider of the game system 172 in order to increase interest in that game or platform by making the avatars available to users of the game or platform who wish to use the avatar.

According to the second channel or business structure, the avatar or other game component is provided to the user 174 on a time limited basis, so that a renewed authorization for continued use is required for each time interval, such as monthly. The monthly renewal may be accompanied by a monthly fee. In one embodiment, the user or player 174 purchases a monthly subscription for use of the customized avatar. It is also foreseen that groups of users could together arrange for their own respective avatars by subscription so that a group of friends may subscribe to play the game together, for example. The time limited use of the avatar via subscription is arranged between the avatar provider 170 and the user or player 174 of the game.

Game companies and other applications that incorporate a character or avatar according to this invention may see a greater interest in the game. The game may have a strong competitive advantage over other games as a result, with increased sales, higher subscription growth and greater subscription renewal rates. As such, the present avatar may be made available as a game component to a game company for a fee, either as a one time fee or for a periodic, for example, annual licensing fee. The game company may thereby ensure that the basic features of the personalized characters have been adapted to the particular game environment, game system, or game style and is thereby available for interested players. These annual licensing fees include the integration and use of an in-game character generation system provided by the game component manufacturer as well.

Multi-player online applications using the game component's technology may be asked to share a portion of their monthly subscriber's fees for continued presence of the personalized characters in the game.

The psychological information gathered from the player by the avatar provider 170 during the avatar generating process may be used to generate advertising directed to the player by an advertiser 176. Ad placement or product placement in game systems 172 and other entertainment media is one avenue of advertising and the game environment of role playing games and multiplayer games provides an opportunity for players to view such products and advertising. Ordinarily, such advertising would be generically applied, but the psychological profile information gathered from the players during the generation of the customized avatar permits advertising to be directed to specific game players. The advertising may be made more effective at reaching its intended audience. As such, the present invention encompasses utilization of the player specific information by the advertiser 176 to provide directed advertising, such as for a fee. The directed advertising is not limited to the in-game environment, but may be extended to advertising outside of the game. This thereby provides an avenue for generating additional revenues through in-game and direct marketing channels. The game component manufacturer 170 may also provide a channel for advertising of new games by adding such advertisements to the game component manufacturer's network, and may charge a fee for such advertisements and/or revenue share for new sales.

Future revenue lines include licensing the game component to non-game applications, such as instant messengers, cell phones, and video applications, as well as providing advertisements for these non-game partners.

In summary, the preferred embodiment provides a role playing video game character or avatar that is generated using images of the player so that the on-screen avatar being controlled by the player appears like the player. Answers to a questionnaire or psychological profile of the player are provided by the player. The characteristics that the player views as desirable, such as greater height, more hair, less weight, are determined and used to generate a final version of the avatar having these characteristics. The number of reward levels of the role playing game is determined and used to generate iterations of the avatar appearance from the initial appearance to the final, more desirable appearance. This avatar component is provided to the role playing game so that as the play of the game proceeds, the player's avatar begins as a character appearing much like themselves and gradually becomes a character that is more like they would like to appear. The avatar may also begin from an initial character that does not appear similar to the player. The iterations may make the avatar gradually less appealing or with other changes in appearance, in some embodiments.

Although other modifications and changes may be suggested by those skilled in the art, it is the intention of the inventors to embody within the patent warranted hereon all changes and modifications as reasonably and properly come within the scope of their contribution to the art.

We claim:

1. A method for providing an avatar for a user for game play, comprising the steps of:
providing questions to the user, said questions including questions about the user's current physical appearance and questions to elicit the user's unconscious desires of physical self, said questions being provided to the user prior to game play;
receiving personal information from the user prior to game play, the personal information including the user's answers to the questions;
deriving psychological information relating to the user's perception of appearance from the answers, said psychological information including information of the user's unconscious desires of physical self;
generating an initial avatar from the personal information prior to game play, said avatar having a physical appearance that is recognizable as the user;
generating a further avatar by applying the personal information of the user to the initial avatar so as to modify the appearance of the initial avatar in accordance with the user's perception of appearance, said further avatar being generated by modifications based on the psychological information including based on the user's unconscious desires of physical self, said further avatar having a physical appearance that is recognizable as the user, the modifications being independent of direct user input so that the user is unable to predict the physical appearance of the further avatar, said further avatar being generated prior to game play; and providing said avatar to the user for use during game play in a displayed image, said displayed avatar being changed from said initial avatar to said further avatar as a result of user input during game play.

2. A method as claimed in claim 1, wherein said questions are provided as a questionnaire to the user requesting information as to the user's perception of their ideal appearance, and wherein said personal information received from the user includes answers to said questionnaire.

3. A method as claimed in claim 1, wherein said step of generating an initial avatar includes utilizing an image of the user.

4. A method for providing an avatar for a role playing game, comprising the steps of:

obtaining a profile of a user including answers to questions that provide the user's personal psychological information on appearance prior to game play of the role playing game;

deriving information on the user's unconscious desires for physical self from the user's personal psychological information;

generating an initial avatar component for the user from personal information of the user, said initial avatar having an appearance that is recognizable as the user;

providing said initial avatar component to a provider of a role playing game for utilization in the role playing game by the user;

generating changes in the initial avatar component based on the user's personal psychological information on appearance so as to make a further avatar component that is more appealing to the user than the initial avatar component yet that is still recognizable as the user, said changes being independent of appearance changes entered by the user, said further avatar changes being established prior to initiation of game play.

5. A method as claimed in claim 4, further comprising the step of:

receiving the personal information from the user for said step of generating said avatar component prior to initiation of game play.

6. A method as claimed in claim 4, wherein said step of generating changes in said avatar component includes the substeps of:

generating a final avatar prior to initiation of game play; and generating iterations between said initial avatar and said final avatar, each of said iterations being recognizable as the user.

7. A method as claimed in claim 4, wherein said step of providing said avatar component provides said avatar component to a provider of a first role playing game, and further comprising the step of:

providing said avatar component to a provider of a second role playing game for utilization in the second role playing game by the user.

8. A method as claimed in claim 7, further comprising the step of:

changing said avatar component provided for said first role playing game to match a style of said second role playing game.

9. A method for providing a character or avatar for use in game play, comprising the steps of:

creating an initial avatar having an initial appearance resembling a user;

obtaining a psychological profile of the user prior to initiation of game play, said psychological profile including information on the user's unconscious desires of physical appearance;

creating a final avatar having a final appearance that differs from said initial appearance, said final avatar being generated using psychological information of the user relating to physical characteristics the user finds desirable and attractive, said final avatar being changed from said initial avatar independently from changes input directly by the user, said final avatar incorporating changes in appearance which are determined from the user's unconscious desires of physical self, features of the final avatar being established prior to initiation of game play;

creating iterations of the avatar between said initial avatar and said final avatar; and providing said initial avatar, said iterations, and said final avatar for displayed images.

10. A method according to claim 9, wherein said iterations are created utilizing said initial avatar and said psychological information provided by the user relating to appearance.

11. A method according to claim 9, wherein said, initial avatar is derived from images received from the user, which include scalar information.

12. A method according to claim 9, wherein said, initial avatar is created utilizing an image of the user, which includes scalar information.

13. A method for providing a character or avatar for a role playing game, comprising the steps of:

requesting user information, said information including current appearance information of the user and information on aspects of appearance that the user considers desirable, said information including psychological profile information of the user;

accepting the user information from a user regarding an avatar to be generated;

generating an initial avatar from said user information from the current appearance information of the user;

deriving information regarding the user's unconscious desires of physical self from the psychological profile;

generating a final avatar from said user information on aspects that the user considers desirable including the information on the user's unconscious desires of physical self, said final avatar being changed from said initial avatar in ways determined by said psychological profile so that said final avatar has an appearance that depends on psychological desires of the user and independent of direct input of the user, said final avatar being recognizable as the user, the appearance of the final avatar being established prior to initiation of game play by the user;

generating iterations between said initial avatar and said final avatar; and providing said initial avatar and said final avatar and said iterations to a role playing game.

14. A method as claimed in claim 13, wherein said step of requesting user information includes providing a questionnaire that requests information concerning appearance features that the user considers desirable, and said step of accepting user information includes receiving answers to said questionnaire.

15. A method as claimed in claim 13, wherein said user information accepted from the user includes psychological information about which physical features the user considers desirable for appearance.

16. A method as claimed in claim 13, further comprising the steps of:
receiving an indication of a number of iterations possible in the role playing game; and
generating a corresponding number of iterations of the avatar.

17. A method as claimed in claim 13, wherein said user information accepted from the user includes information about modifying the initial avatar.

18. An avatar or character for representing a user on a display, comprising:
a data set defining an appearance of an initial avatar, said initial avatar being based on user provided images and on parameters for a displayed character, said initial avatar being recognizable as the user, said initial avatar being used by the user to represent the user on a display;
a data set defining an appearance of a final avatar, said final avatar being based on said initial avatar and on user psychological information relating to appearance characteristics that are considered desirable by the user, said final avatar having an appearance that differs from an appearance of said initial avatar, said psychological information including answers to questions provided to the user from which has been derived information on the user's unconscious desires of physical self, said final avatar differing in appearance from said initial avatar in ways determined by said psychological information, said final avatar being recognizable as the user, said data set defining an appearance of the final avatar being generated prior to the user using the initial avatar to represent the user on the display;
a data set defining appearances of iterations of the avatar, said iterations of the avatar being defined by parameters for the displayed character and said initial avatar and said final avatar.

19. The avatar of claim 18, wherein said parameters for a displayed character includes a wireframe that defines at least one of a position and movements of the avatar;
said initial avatar data set includes appearance data that is applied over the wireframe; and
said final avatar and said iterations data sets being applied over the wireframe as needed.

20. The avatar of claim 18, wherein said final avatar includes changes in appearance independent of changes the user wants.

21. A system for playing a role playing video game, comprising:
a computer processor;
a memory device connected in communication with said computer processor;
a user input connected by a communication channel to said computer processor to communicate user input to said computer processor;
a display connected by a communication channel to said computer processor to display the role playing video game;
software stored on computer readable media and being capable of being executed by said computer processor to generate an avatar for use by a user during play of the role playing video game, said avatar having an appearance recognizable as the user, said software posing questions to the user and receiving input from the user relating to a psychological profile of the user, said software deriving information on the user's unconscious desires of physical self and generating a changes in said avatar depending on the psychological profile including changes based on the unconscious desires, said changes being independent of appearance changes directly input by the user so that the avatar is changed in appearance according to the psychological desires of the user, said changes in the appearance of the avatar being determined prior to initiation of play of the role playing video game.

* * * * *